(12) United States Patent
Glasl et al.

(10) Patent No.: US 7,591,930 B2
(45) Date of Patent: Sep. 22, 2009

(54) THIN-FILM EVAPORATOR

(75) Inventors: Wolfgang Glasl, Graz (AT); Matthaeus Siebenhofer, Krakaudorf (AT); Michael Koncar, Lieboch (AT)

(73) Assignee: VTU Holding GmbH, Grambach (DE)

( * ) Notice: Subject to any disclaimer, the term of this patent is extended or adjusted under 35 U.S.C. 154(b) by 461 days.

(21) Appl. No.: 11/394,227

(22) Filed: Mar. 31, 2006

(65) Prior Publication Data

US 2006/0231378 A1    Oct. 19, 2006

Related U.S. Application Data

(63) Continuation of application No. PCT/AT2004/000335, filed on Oct. 1, 2004.

(30) Foreign Application Priority Data

Oct. 2, 2003  (AT)  ............... A 1567/2003

(51) Int. Cl.
*B01D 1/22* (2006.01)
*B01D 3/28* (2006.01)

(52) U.S. Cl. ............ 202/176; 159/6.2; 159/11.1; 159/13.2; 159/DIG. 20; 202/236; 202/238

(58) Field of Classification Search ........... 159/6.2, 159/11.1–11.3, 13.1–13.4, 49, DIG. 20; 202/176, 202/236, 238, 259; 165/109.1, 914
See application file for complete search history.

(56) References Cited

U.S. PATENT DOCUMENTS

| | | | | |
|---|---|---|---|---|
| 3,617,225 A | * | 11/1971 | Kuehne et al. | 422/134 |
| 3,630,688 A | * | 12/1971 | Takiguchi et al. | 422/135 |
| 4,409,137 A | * | 10/1983 | Mergan et al. | 588/3 |
| 4,981,554 A | | 1/1991 | Loconsolo et al. | |
| 6,066,232 A | | 5/2000 | Vansant et al. | |
| 2002/0134517 A1 | | 9/2002 | Inaba et al. | |

FOREIGN PATENT DOCUMENTS

| | | |
|---|---|---|
| DE | 32 40 725 A | 5/1983 |
| DE | 34 01 121 A1 | 1/1984 |
| DE | 35 13 376 A1 | 4/1985 |
| DE | 41 07 844 A1 | 3/1991 |
| EP | 0 066 790 A1 | 5/1982 |
| FR | 1 601 580 A | 8/1970 |
| WO | WO 93/02075 A | 2/1993 |

* cited by examiner

*Primary Examiner*—Virginia Manoharan
(74) *Attorney, Agent, or Firm*—Dickstein Shapiro LLP (57) ABSTRACT

A thin-film evaporator with a vertical drum (1), a supply line (4) that is arranged in the upper region of the drum (1) and is used to supply a medium to be evaporated, a heating jacket (3) arranged on the periphery of the drum and forming vapors, a discharge line (20) for discharging the residue left in the lower end of the drum, and a condenser (11) supplied with a coolant, for increasing the separating capacity and optionally for performing chemical reactions, is characterized in that an inner device (24) influencing the action of the thin-film evaporator is provided in the path of the vapors from the heating jacket (3) to the condenser (11).

21 Claims, 7 Drawing Sheets

THIN-FILM EVAPORATOR

This is a continuation of International Application No. PCT/AT2004/000335, filed on Oct. 1, 2004.

BACKGROUND OF THE INVENTION

The invention relates to a thin-film evaporator comprising a vertical drum, a supply line that is arranged in the upper region of the drum and is used to supply a medium to be evaporated, a heating jacket arranged on the periphery of the drum and forming vapours, a discharge line for discharging the residue left in the lower end of the drum, and a condenser supplied with a coolant.

Temperature-sensitive substances such as, for example, pharmaceutical solutions or food concentrates may be heated to the boiling point only temporarily. So-called thin-film evaporators in which the medium to be evaporated or the solution to be concentrated by evaporation, respectively, is applied to the evaporator area only as a thin film serve for meeting this demand. The result of this is just a short contact time with the heating surface so that thermally unstable liquids and substances, respectively, can also be used and are only exposed to a low evaporation temperature, in particular also under a vacuum or at a very low pressure. Furthermore, thin-film evaporators are used for separation tasks if the product accumulating as a residue has poor flow properties and/or is prone to agglutinations.

Thin-film evaporation processes are based on the principle of simple distillation according to which the separating capacity of said type of evaporator is limited. Thin-film evaporators are available in various designs, for example as falling-film evaporators or as rotary evaporators (known from Chemie Technik by Dr. Ing. Eckhard Ignatowitz, $5^{th}$ edition, Europafachbuchreihe, page 306).

SUMMARY OF THE INVENTION

It is the object of the invention to improve the evaporator type thin-film evaporator in terms of increasing the separating capacity, whereby, advantageously, also a saving of energy—preferably both of cooling and heating energy—and optionally also a chemical reaction during the evaporation process are supposed to be feasible and/or accelerable, respectively.

In case of an evaporator type thin-film evaporator, this object is achieved according to the invention in that an inner device influencing the action of the thin-film evaporator is provided in the path of the vapours from the heating jacket to the condenser, with the inner device advantageously being designed with a circular cross-section and preferably being arranged so as to be equally distant from the condenser or directly resting on the exterior of the same.

Thereby, the inner device is suitably designed as a mass transfer area.

According to a preferred embodiment, the inner device is designed as a catalyst, in particular as a heterogeneous catalyst.

Efficient energy saving can be achieved in that the inner device is designed as a heat-exchange surface and preferably is connected to a supply line for the medium to be evaporated in order to preheat the medium to be evaporated.

According to the invention, a rotary thin-film evaporator is characterized in that the inner device between the condenser and a wiping device movable on the inside along the drum jacket is provided for a medium to be evaporated which is introduced into the drum from above.

The invention can also be used for a falling-film evaporator, with said evaporator exhibiting at least two drums.

Depending on the design of the thin-film evaporator, the condenser is arranged in the central region of the drum or outside of the drum.

If the condenser is arranged outside of the drum, it may exhibit an additional heat-exchange surface for preheating the medium to be evaporated.

According to a preferred embodiment, a supply line for a substance, especially a liquid, influencing the action of the thin-film evaporator, such as a reaction liquid, a washing liquid or a residue or a distillate, is conducted to the inner device.

The inner device can be configured as a wire double cylinder and preferably can be filled with filler materials or catalysts or can also be designed as a knitted wire fabric or as a cylindrical sealing ring.

A preferred embodiment is characterized in that the inner device is movable in the space between the heating jacket and the condenser and, in particular, can be set in rotation, whereby, suitably, the inner device is movable with the mixing device and, in particular, is coupled to the same.

BRIEF DESCRIPTION OF THE DRAWINGS

In the following, the invention is illustrated in further detail by way of several exemplary embodiments with reference to the drawing wherein thin-film evaporators are shown in schematic sectional views, with FIGS. 1 to 7 and 12 in each case showing rotar evaporators.

DETAILED DESCRIPTION OF THE PREFERRED EMBODIMENT

Figure 1:
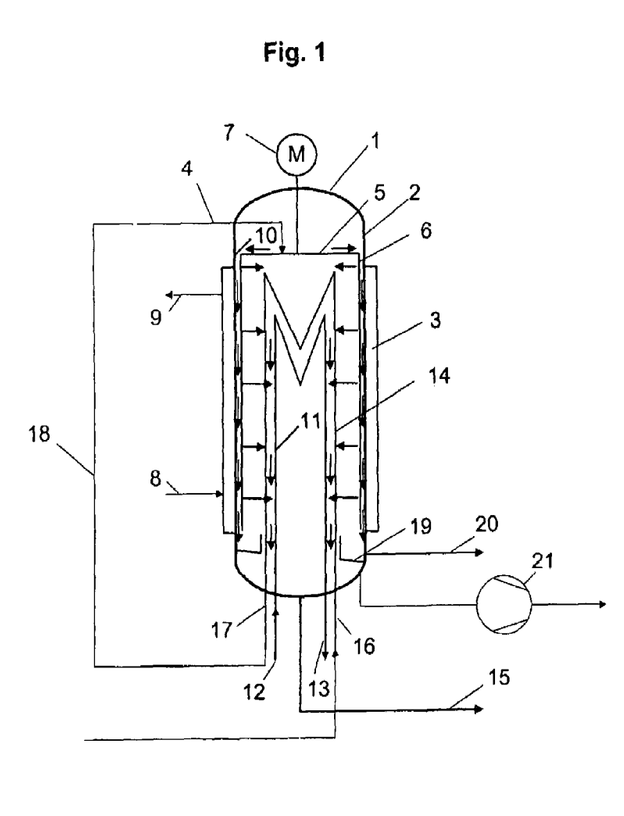

The rotary evaporator according to FIG. 1 has an upright cylindrical drum 1 closed at the top and at the bottom, whose cylindrical part 2 is surrounded by a heating jacket 3. In the upper region of the drum 1, a supply line 4 for the medium to be evaporated is provided. A rotor 5 comprising a wiping device 6 is arranged in the drum 1, which rotor is actuatable by a motor 7 arranged outside of the drum 1. The supply line 8 for a heating medium is located at the lower end of the heating jacket 3, the discharge line 9 for the heating medium is located at the upper end thereof.

If water vapour is used as a heating medium, the supply line is located at the upper end of the heating jacket and the discharge line of the condenser is located at the lower end.

The rotor 5 is arranged in a suspended manner via a pivot bearing only at the upper end of the drum 1 and is designed as a cylindrical basket open at the bottom.

The medium to be evaporated is applied from above to the interior wall 10 of the cylindrical part 2 of the drum 1 and runs down the interior wall 10 as a liquid film, with the medium being heated to the boiling point. As the liquid film of the medium is running down, the liquid is repeatedly spread on the interior wall 10 of the drum 1 by the wiper blades of the wiping device 6 of the rotor 5, whereby the evaporation process is accelerated.

A condenser 11, through which a cool medium flows, is located in the centre of the drum 1. The supply line 12 for the coolant and the discharge line 13 for the coolant are located at the lower end of the drum 1.

According to the invention, the condenser 11 is surrounded by a further condenser 14 which thus ends up lying between the centrally arranged condenser 11 and the rotor 5 and the wiping device 6 thereof. The hot vapours formed from the medium to be evaporated are condensed at the two condensers 11 and 14 and flow along the same to the lower end of the drum 1, where the drain 15 for the distillate is located.

According to the invention, the medium to be evaporated is supplied via a supply line 16 to the condenser 14 arranged between the centrally arranged condenser 11 and the wiping device 6 and is preheated via the same as the hot vapours are being condensed. Said preheated medium to be evaporated then reaches the upper end of the drum 1 via a discharge line 17 of the condenser 14 and a duct 18, where it is introduced via the supply line 4 and is distributed radially outwards onto the interior wall 10 of the drum 1, using the rotor 5.

The residue, i.e. the portion of the medium to be evaporated which has not been evaporated, flows over the interior wall 10 of the drum 1 to the lower end, where it is collected in an annular chamber 19 and discharged from the drum 1 via a discharge line 20. A vacuum pump is indicated by 21.

Figure 2:
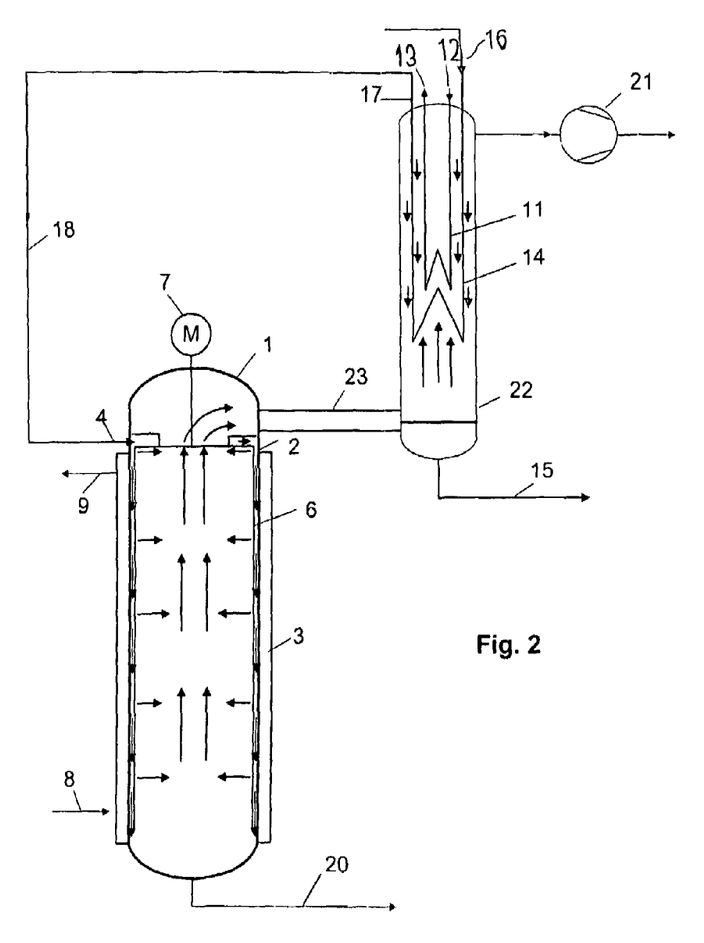

According to the embodiment illustrated in FIG. 2, the condensers 11, 14, which in FIG. 1 are arranged inside the drum 1, are provided outside of the drum 1 in a separate cylindrical receptacle 22. The hot vapours are withdrawn at the upper end of the drum 1 and are conducted to the condensers 11 and 14 via a pipe 23 connecting the drum 1 with the receptacle 22 in which the condensers 11 and 14 are located. In this case, the vacuum pump 21 is connected to the receptacle 22. The annular chamber 19 for collecting the residue is unnecessary in this embodiment; the residue is withdrawn at the lower end of the drum 1.

Figure 3:
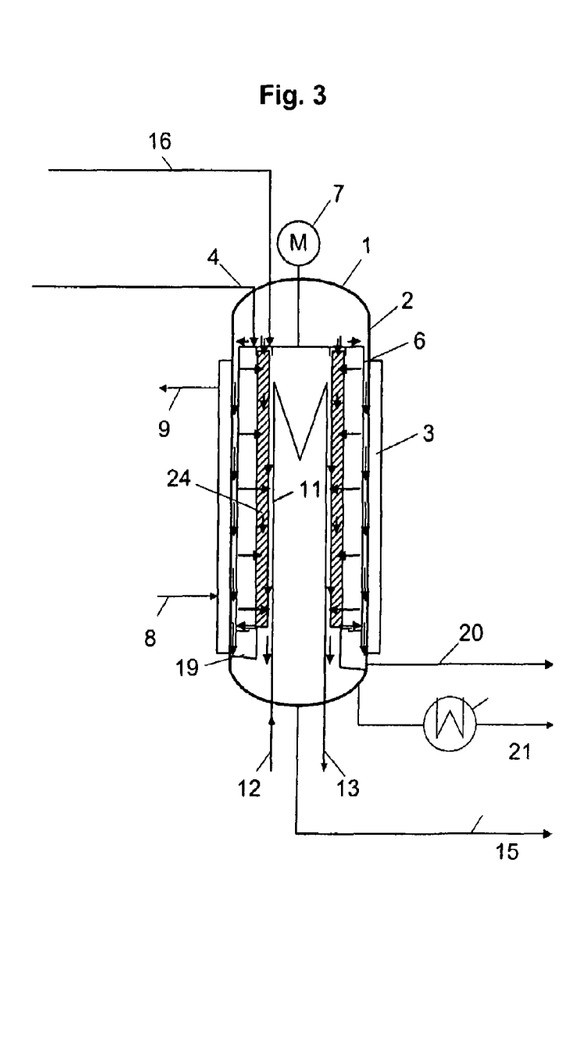

FIG. 3 illustrates a rotary evaporator of a design similar to that shown in FIG. 1, wherein, however, no preheating of the medium to be evaporated is provided in the interior of the drum 1; rather, in this case, an inner device 24 is provided between the centrally arranged condenser 11 passed through by the coolant and the wiping device 6, such as, for example, a wire double cylinder forming a cylindrical annular chamber roughly having the height of the cylindrical part 2 of the drum 1. It is possible to provide catalysts or filler materials, respectively, in said cylindrical annular chamber for increasing the mass transfer area formed by the inner device 24. Via a further supply line 16 at the upper end of the drum 1, it is possible to supply a reaction liquid, a washing liquid or also a distillate to said inner device 24 between the condenser 11 and the wiping device 6.

Figure 4:
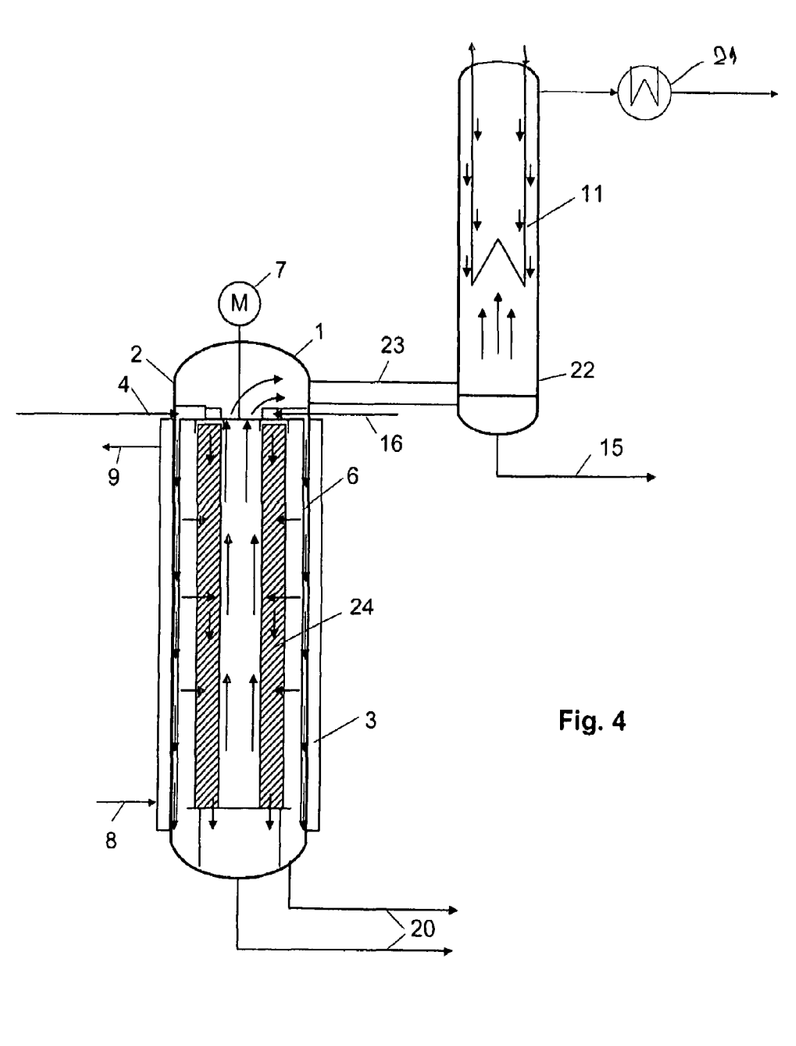

The embodiment according to FIG. 4 again differs from that according to FIG. 3 in that the condenser 11 is arranged in a separate receptacle 22, which, in analogy to FIG. 2, communicates with the drum 1 via a pipeline 23.

Figure 5:
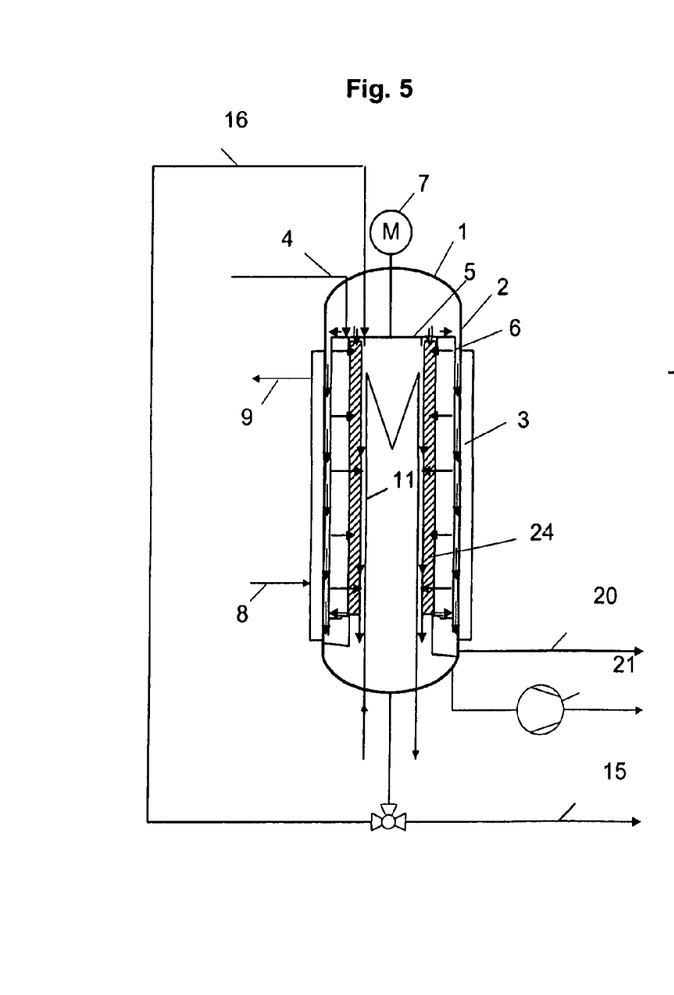

FIG. 5 illustrates the supply of distillate to the inner device 24 of a thin-film evaporator designed in analogy to the one shown in FIG. 3, which inner device is arranged between the condenser 11 and the wiping device 6.

Figure 6:
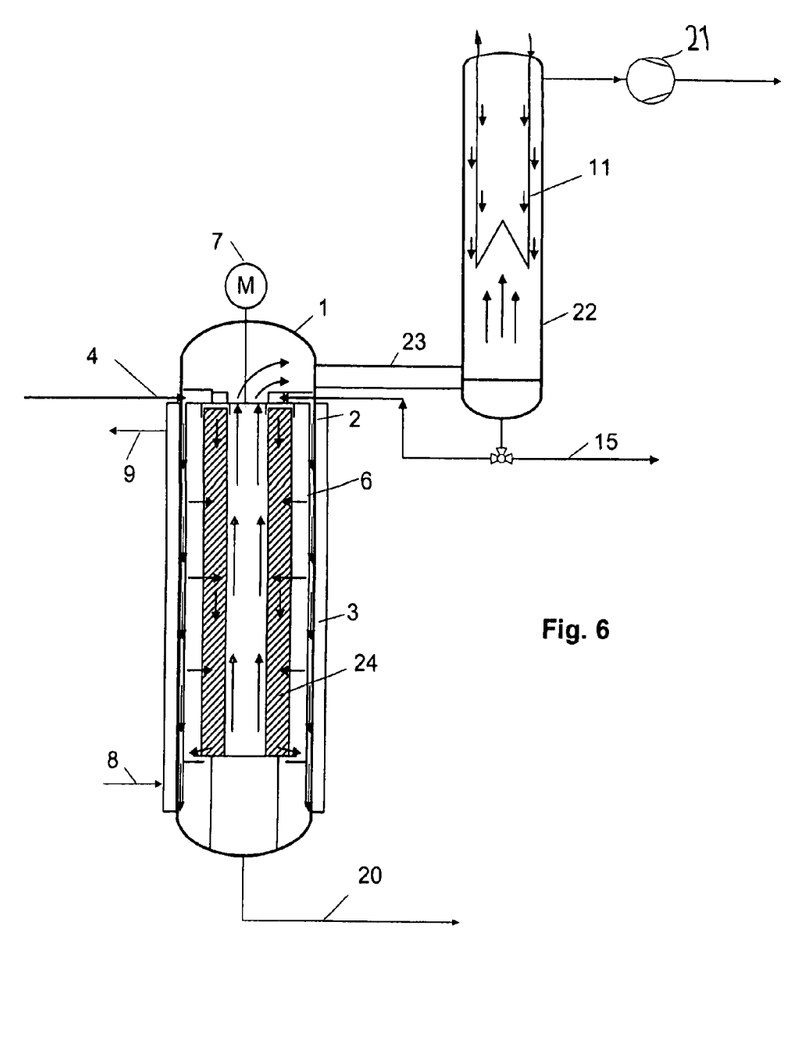

FIG. 6, in turn, shows the counterpart thereof comprising an external condenser 11.

Figure 7:
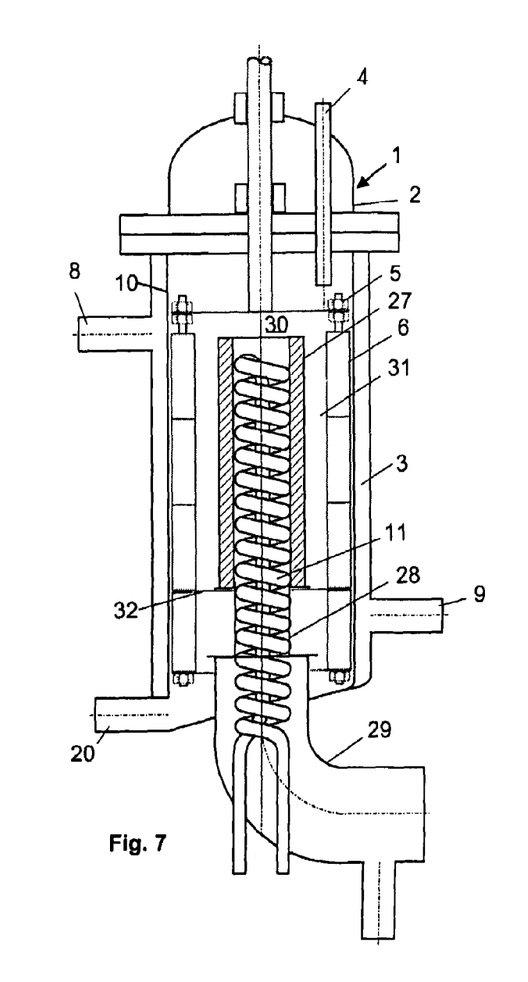
Figure 8:
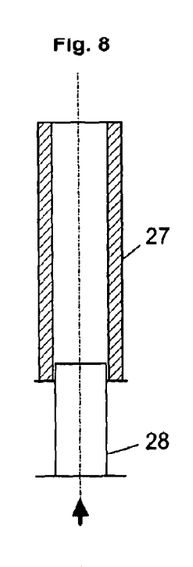
FIGS. 8 to 11 illustrate fittings of the rotary evaporator according to FIG. 7, and FIGS. 13 to 16 illustrate fittings of the rotary evaporator of FIG. 12.
Figure 9:
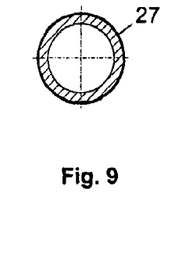
Figure 10:
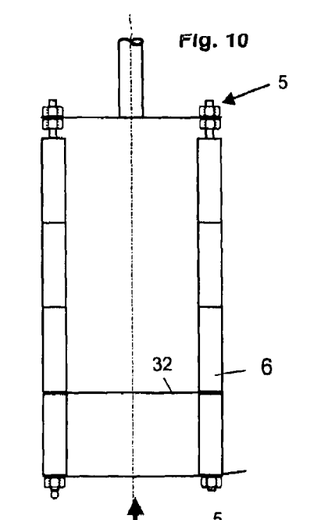
Figure 11:
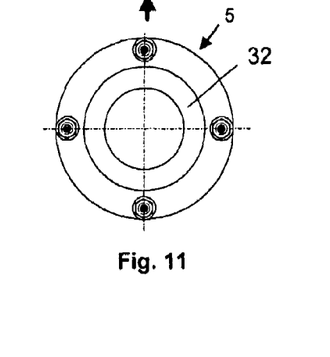

In FIG. 7, a modified rotary evaporator is illustrated which exhibits a snakelike condenser 11, over which a knitted wire fabric 27 closed on the top side is placed. The lower part of the knitted wire fabric 27 is formed by a cylindrical pipe 28 which is designed such that it rests on an outlet nozzle 29 for the distillate and the waste gas, respectively, thus causing a separation between the condenser space 30 and the evaporator space 31. Due to a partial contact with the condenser 11, the knitted wire fabric 27 has the effect that a part of the distillate gets into the knitted wire fabric 27 and thus is available for mass transfer.

On the bottom side of the rotor 5, a backup ring 32 is provided which has the function of collecting excess liquid dripping from the knitted wire fabric 27 which forms the inner device and conducting the same to the evaporator area, i.e. to the interior 10 of the drum 1, via the centrifugal force caused by the motion of rotation. At the upper end of the drum 1, the supply pipe 33 for charging the feed material is attached.

Figure 12:
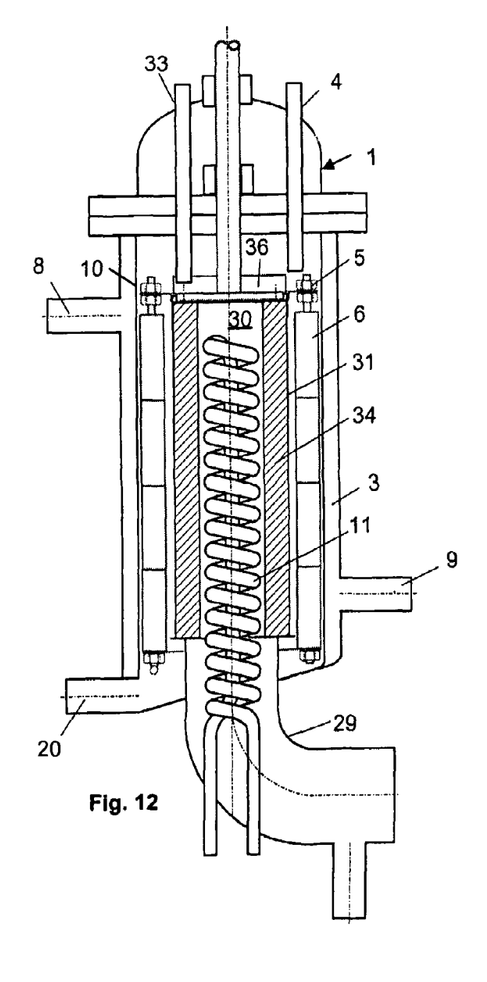
Figure 13:
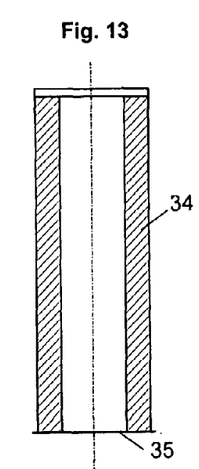
Figure 14:
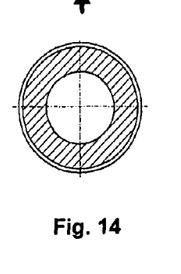
Figure 15:
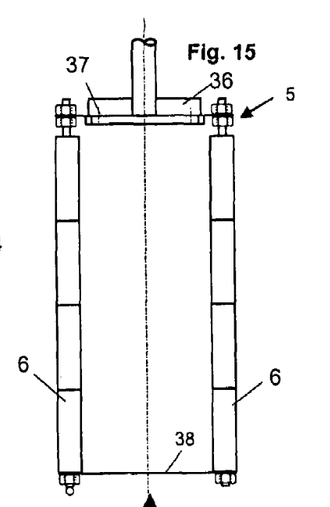
Figure 16:
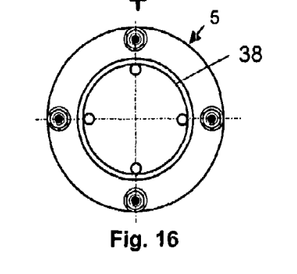

According to the rotary evaporator illustrated in FIG. 12, a wire double cylinder 34 which serves for receiving a catalyst is provided above the condenser 11. The lower part of the wire double cylinder 34 forms a ring 35 which rests on the outlet nozzle 29 for the distillate, thus providing a separation between the condenser space 30 and the evaporator space 31. The upper part of the wire double cylinder 34 has an open design so that the liquid supplied via a feeding disk 36 reaches, via bores 37, also the catalyst located in the wire double cylinder 34. The bottom side of the rotor 5 also exhibits a backup ring 38 which serves for collecting excess liquid dripping down from the inner device 34 and conducting the same to the evaporator area, i.e. to the interior 10 of the drum 1, via the centrifugal force caused by the motion of rotation. At the upper end of the drum 1, a supply line 4 for the feed material and a supply line 33 for charging a liquid are provided.

Figure 17:
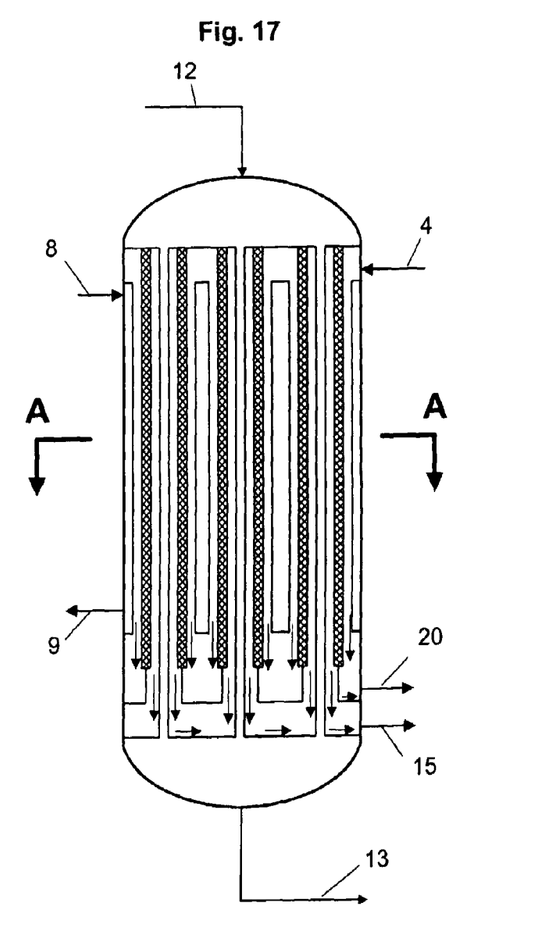
In FIG. 17, a falling-film evaporator is illustrated.
Figure 18:
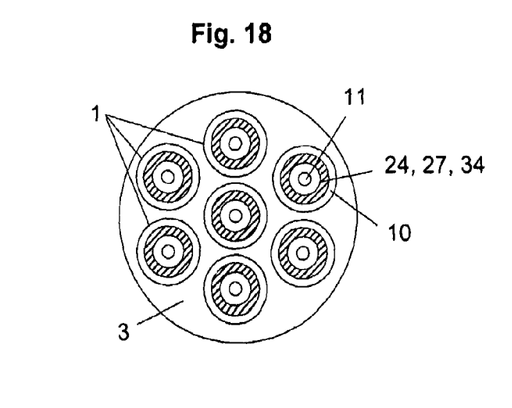
FIG. 18 shows a section taken along line AA transversely to the longitudinal axis of said evaporator.

FIG. 17 shows a falling-film evaporator comprising several drums 1 which, in each case, are flushed by a heating medium and altogether are installed in a receptacle. A condenser 11 is fitted centrally for each drum 1, and an inner device 24, 27 or 34 is installed between said condenser and the interior wall 10 of the drum 1 according to one of the above-described embodiments.

Figure 19:
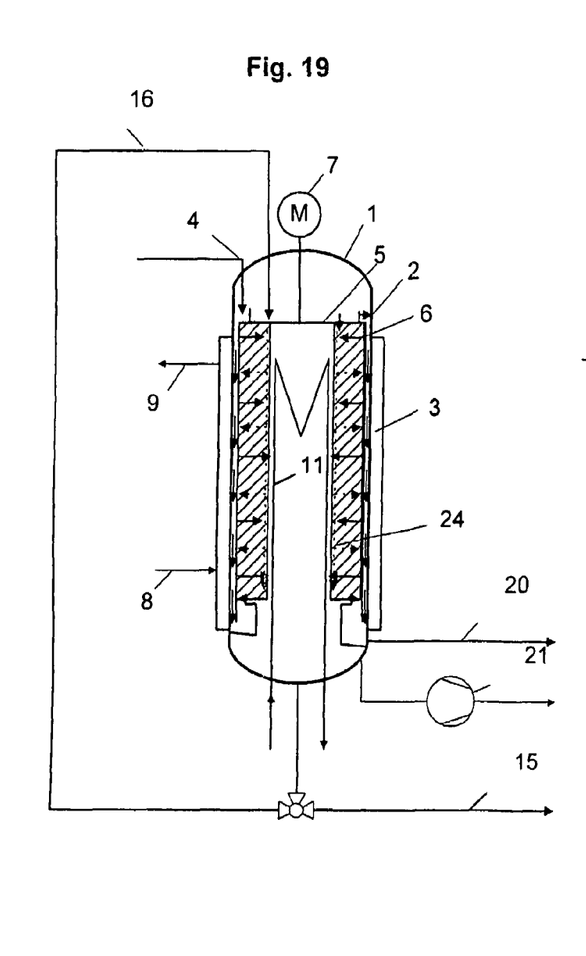
FIGS. 19 and 20 show further variants.
Figure 20:
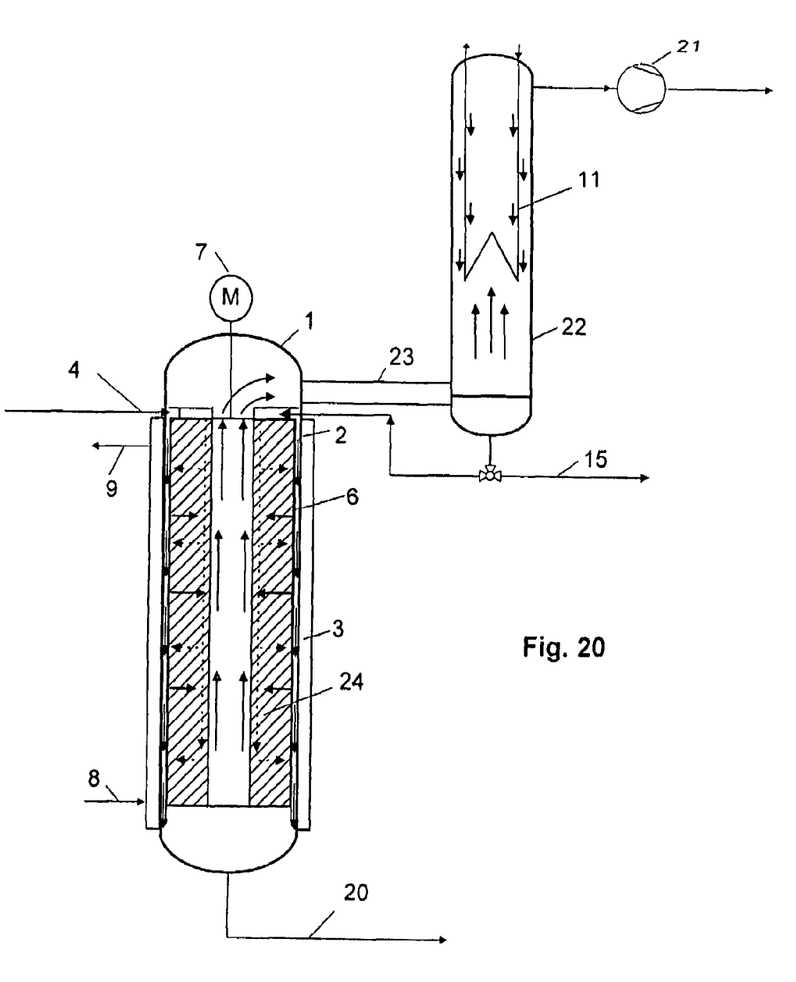

According to a further variant, the inner device can also rotate. As a result, the liquid phase which has been supplied or has been deposited on the inner device or has condensed, respectively, is completely or partially returned to the evaporator area via the centrifugal force produced by rotation. Two variants with a rotating inner device 24 are illustrated in FIGS. 19 and 20. These embodiments are according to those illustrated in FIGS. 5 and 6. In each case, the inner device 24 is connected to the rotating wiping device 6—and thus is actuated by the motor 7.

The following examples illustrate the use of the thin-film evaporators according to the invention.

EXAMPLE 1

780 g of fatty acid methyl ester was distilled at a pressure of 0.2 mbar in a thin-film evaporator according to FIG. 7—however, without a knitted wire fabric 27. The temperature of the heat transfer oil amounted to 165° C. The yield (distillate/amount used) of distillate amounted to 97.8%. A sample of the distillate was examined by scanning electron microscopy. Traces of salt crystals (size approx. 1 μm) were found.

The same starting product was distilled in the same apparatus under the same conditions, however, a knitted wire fabric 27 closed on the top side was placed over the internal cooling coil.

Result:

A sample of the distillate was again examined with the scanning electron microscope. Neither traces of crystalline substances nor other impurities were found. A special advantage of the knitted wire fabric is that splashes of the medium to be evaporated do not reach the condenser 11 and thus do not get into the residue.

EXAMPLE 2

A thin-film evaporator according to FIG. 1—however, without a condenser 14—having an evaporator area of 9 m$^2$ was continuously charged with a feed flow of 1,820 kg/h. The feed temperature amounted to 40° C. The evaporator was heated with high-pressure steam at 20 bar abs, with the heating temperature being adjusted via pressure valves. The distillation pressure amounted to 0.8 mbar. 1,690 kg/h was withdrawn as a distillate. The residue amounted to 112 kg/h. This is equivalent to a residue ratio (residue/distillate) of 6.6%. 598 kg/h of water vapour was consumed in this adjustment.

In a further step, the feed flow was conducted under constant conditions through a pipe coil which functioned as a preheater and as a condenser 14 and was wound around the central condenser 11.

Result:

The feed temperature before entering the evaporator could be raised to 129° C. The steam consumption of the distillation decreased to 406 kg/h.

This is equivalent to an energy saving of 32%.

EXAMPLE 3

In two experiments, 800 g of a glycerol phase were distilled in each case at a pressure of 1.3 mbar in a thin-film evaporator according to FIG. 7—however, without a knitted wire fabric for the first experiment. The composition of the glycerol phase and of the distillate recovered in Experiment 1 (amount 656 g) can be seen in Table 1.

For Experiment 2, the following modifications were performed on the evaporator. A knitted wire fabric 27 (mesh width 1 mm; wire diameter approx. 0.2 mm; wound in several layers; total thickness approx. 4 mm) closed on the top side was placed over the internal condenser 11. The lower part was formed by a cylindrical pipe 28 which was designed such that it could be placed over the outlet nozzle 29 for the distillate and the waste gas, respectively, thus providing a separation between the condenser space 30 and the evaporator space 31. The partial contact of the knitted wire fabric 27 with the condenser 11 thus created the precondition for a part of the distillate to get into the knitted wire fabric 27 in order to be available for the mass transfer.

In the lower third of the rotor 5, an additional backup ring 32 was fitted which had the function of collecting the liquid dripping down from the knitted wire fabric 27 and conducting the same to the evaporator area 10 via the centrifugal force caused by the motion of rotation.

Result:

The operating parameters for Experiment 2 were the same as for Experiment 1. 658 g of distillate was obtained. The composition of the distillate (see Table 1) produced higher purities in terms of the high-volatile and low-volatile components.

TABLE 1

| Example 3 Conc. in % by weight | Charge Experiments 1 + 2 | Distillate Experiment 1 | Distillate Experiment 2 |
|---|---|---|---|
| Glycerol | 84.7 | 97.6 | 98.9 |
| Water | 0.4 | 0.3 | 0.1 |
| Ashes | 5.8 | 0.1 | n.n. |

TABLE 1-continued

| Example 3 Conc. in % by weight | Charge Experiments 1 + 2 | Distillate Experiment 1 | Distillate Experiment 2 |
|---|---|---|---|
| MONG (calculated) | 9.1 | 2.1 | 1.0 |
| Ester | 2.6 | 0.2 | 0.08 |

EXAMPLE 4

In Experiments 3, 4 and 5, 800 g of a fatty acid methyl ester phase were distilled in each case at a pressure of 0.5 mbar in a thin-film evaporator according to FIG. 12—however, without an inner device 24 for Experiment 3.

For Experiments 4 and 5, the following modifications were performed on the evaporator. A wire double cylinder 34 (mesh width 1 mm; wire diameter approx. 0.2 mm; total thickness (outer radius—inner radius) approx. 10 mm) filled with the catalyst amberlyst (=amine-substituted solid ion exchanger) 15 was placed over the internal condenser 11.

The lower part was formed by a ring 35 which was designed such that it could be placed over the outlet nozzle 29 for the distillate and the waste gas, respectively, thus providing a separation between the condenser space 30 and the evaporator space 31.

The upper part had an open design so that the liquid supplied via the feeding disk 34 could reach, via bores 37, the catalyst located in the wire double cylinder 24.

The ring 35 on the bottom side of the rotor 5 had the function of collecting the excess liquid dripping down from the inner device 34 and conducting the same to the evaporator area 10 via the centrifugal force caused by the motion of rotation.

Via an additional nozzle 33 in the upper part of the evaporator, 100 g of oleic acid was steadily added throughout the Experiment 5, which oleic acid could reach the inner device 34 via the feeding and distributing disk 36, respectively, in order to react with the methanol contained in the fatty acid methyl ester phase.

The operating parameters for Experiments 4 and 5 were the same as for Experiment 3 which was carried out without the inner device 34 and without the addition of oleic acid, respectively.

Result:

The amounts and compositions of the feed materials and distillates in the experiments are indicated in Table 2.

In Experiment 4, the neutralization number was lower than in Experiment 3, since free fatty acid and methanol reacted in the evaporator to form fatty acid methyl ester.

In Experiment 5, the amount of fatty acid methyl ester was substantially higher and the neutralization number was lower than in Experiment 3, since free fatty acids of the starting product and oleic acid reacted with methanol in the evaporator to form methyl ester.

TABLE 2

| Example 4 | | Charge Experiments 3 + 4 | Distillate Experiment 3 | Distillate Experiment 4 | Distillate Experiment 5 |
|---|---|---|---|---|---|
| Amount | g | 800 | 760 | 760 | 810 |
| Methyl ester | % by weight | 94.7 | 97.6 | 97.8 | 98.9 |
| Water | ppm | 800 | 40 | 50 | 50 |
| Methanol | % by weight | 1.0 | n.n. | n.n. | n.n. |
| Neutralization number | mg KOH/g | 0.4 | 0.35 | 0.07 | 0.09 |

EXAMPLE 5

In Experiments 6 and 7, 800 g of a methyl ester phase were distilled in each case at a pressure of 0.5 mbar in a thin-film evaporator according to FIG. 12—however, without an inner device 34 for Experiment 6.

For Experiment 7, the following modifications were performed on the evaporator. A wire double cylinder 34 (mesh width 1 mm; wire diameter approx. 0.2 mm; total thickness (outer radius—inner radius) approx. 10 mm) filled with glass beads (diameter 4 mm) was placed over the internal condenser 11.

The lower part was formed by a ring 35 which was designed such that it could be placed over the outlet nozzle 29 for the distillate and the waste gas, respectively, thus providing a separation between the condenser space 30 and the evaporator space 31.

The upper part has an open design so that the liquid supplied via the feeding disk 36 could reach, via bores 37, the glass beads located in the wire double cylinder 34.

The backup ring 38 on the bottom side of the rotor 5 had the function of collecting the excess liquid dripping down from the wire twin basket 24 and conducting the same to the evaporator area 10 via the centrifugal force caused by the motion of rotation.

Via an additional nozzle 33 in the upper part of the evaporator, 80 g of trioctylamine was steadily added throughout the Experiment, which trioctylamine could reach the inner device 34 via the feeding disk 36 in order to absorb substances from the gas phase.

The operating parameters for Experiment 7 were the same as for Experiment 6 which was carried out without said fitting.

Result:

As a result of the modification, a higher purity of the distillate was achieved in Experiment 7 (see Table 3).

TABLE 3

| Example 5 | | Charge Experiments 6 + 7 | Distillate Experiment 6 | Distillate Experiment 7 |
|---|---|---|---|---|
| Amount | g | 800 | 760 | 756 |
| Methyl ester | % by weight | 94.7 | 97.6 | 97.9 |
| Water | ppm | 800 | 40 | 35 |
| Methanol | % by weight | 1.0 | n.n. | n.n. |
| Neutralization number | mg KOH/g | 0.4 | 0.35 | 0.05 |

Summary:

The particular advantages of the thin-film evaporators according to the invention consist in an increase of the separating capacity by installing mass transfer areas directly in the evaporation space, in the charging of a reflux to the mass transfer area, in the recirculation of the liquid flow to the evaporator area as well as in the charging of a washing liquid.

By means of the thin-film evaporators according to the invention, chemical reactions can be carried out, namely by installing heterogeneous catalysts in the evaporation space and/or by installing mass transfer areas as well as by adding reactants directly into the evaporation space. According to the invention, combinations of distillation, absorption and chemical reaction can thus be realized.

Pipes, packings, knitted fabrics, filler materials or floors might be considered as suitable mass transfer areas.

Furthermore, substantial energy savings during the operation of the thin-film evaporator are rendered possible by the installation of temperature-exchange surfaces as illustrated, e.g., in FIG. 1.

What is claimed is:

1. A thin film evaporator comprising:
a vertical drum,
a supply line that is arranged in the upper region of the drum and is used to supply a medium to be evaporated,
a heating jacket arranged on the periphery of the drum and forming vapors,
a discharge line for discharging the residue left in the lower end of the drum,
a condenser supplied with a coolant, and
an inner device surrounding the condenser and influencing the action of the thin-film evaporator, the inner device comprising at least one of a mass transfer area, a catalyst or a heat-exchange surface, provided in the path of the vapors from the heating jacket to the condenser, wherein the inner device is provided between the condenser and a wiping device movable on the inside along the jacket for a medium to be evaporated which is introduced into the drum from above.

2. A thin-film evaporator according to claim 1, wherein the inner device is designed with a circular cross-section.

3. A thin-film evaporator according to claim 2, wherein the inner device is arranged so as to be equally distant from the condenser or directly rests on the exterior of the same.

4. A thin-film evaporator according to claim 1, wherein the inner device is designed as a mass transfer area.

5. A thin-film evaporator according to claim 1, wherein the inner device is designated as a catalyst.

6. A thin-film evaporator according to claim 5, wherein the catalyst is a heterogeneous catalyst.

7. A thin-film evaporator according to claim 1, wherein the inner device is designed as a heat-exchange surface.

8. A thin-film evaporator according to claim 7, wherein the inner device is connected to a supply line for the medium to be evaporated in order to preheat the medium to be evaporated.

9. A thin-film evaporator according to claim 1, wherein it is designed as a falling-film evaporator comprising at least two drums.

10. A thin-film evaporator according to claim 1, wherein the condenser is arranged in the central region of the drum or of the drums, respectively.

11. A thin-film evaporator according to claim 1, wherein the condenser is arranged outside of the drum, in a receptacle.

12. A thin-film evaporator according to claim 11, wherein an additional heat-exchange surface for preheating the medium to be evaporated is provided in the receptacle.

13. A thin-film evaporator according to claim 1, wherein a supply line for a substance influencing the action of the thin-film evaporator is conducted to the inner device.

14. A thin-film evaporator according to claim 13, wherein the substance is at least one of a reaction liquid, a washing liquid, a residue or a distillate.

15. A thin-film evaporator according to claim 1, wherein the inner device is configured as a wire double cylinder.

16. A thin-film evaporator according to claim 15, wherein the inner device is filled with at least one of filler materials or catalysts.

17. A thin-film evaporator according to claim 1, wherein the inner device is designed as a knitted wire fabric.

18. A thin-film evaporator according to claim 1, wherein the inner device is movable in the space between the heating jacket and the condenser.

19. A thin-film evaporator according to claim 18, wherein the inner device can be set in rotation.

20. A thin-film evaporator according to claim 18, wherein the inner device is movable with a mixing device.

21. A thin-film evaporator according to claim 20, wherein the inner device is coupled to the mixing device.

* * * * *

UNITED STATES PATENT AND TRADEMARK OFFICE
CERTIFICATE OF CORRECTION

PATENT NO. : 7,591,930 B2  Page 1 of 1
APPLICATION NO. : 11/394227
DATED : September 22, 2009
INVENTOR(S) : Glasl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 636 days.

Signed and Sealed this

Twenty-first Day of September, 2010

David J. Kappos
*Director of the United States Patent and Trademark Office*